(12) United States Patent
Niwa

(10) Patent No.: US 7,705,799 B2
(45) Date of Patent: Apr. 27, 2010

(54) DATA PROCESSING DEVICE, DATA PROCESSING METHOD, AND ELECTRONIC DEVICE

(75) Inventor: Souhei Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 1371 days.

(21) Appl. No.: 11/137,454

(22) Filed: May 26, 2005

(65) Prior Publication Data

US 2005/0264540 A1 Dec. 1, 2005

(30) Foreign Application Priority Data

Jun. 1, 2004 (JP) ............................. 2004-163255

(51) Int. Cl.
*G09G 5/00* (2006.01)
*G06F 3/041* (2006.01)
(52) U.S. Cl. ........................ 345/1.1; 345/173; 345/901
(58) Field of Classification Search ................. 345/173, 345/156, 169, 1.1, 2.3, 901, 905, 3.1
See application file for complete search history.

(56) References Cited

U.S. PATENT DOCUMENTS

| | | | | |
|---|---|---|---|---|
| 6,072,476 A | * | 6/2000 | Harada et al. ............... | 345/901 |
| 6,107,988 A | * | 8/2000 | Phillipps ..................... | 345/156 |
| 6,909,424 B2 | * | 6/2005 | Liebenow et al. ........... | 345/169 |
| 7,154,480 B2 | * | 12/2006 | Iesaka ........................ | 345/173 |
| 2002/0180767 A1 | * | 12/2002 | Northway et al. ........... | 345/905 |
| 2005/0104855 A1 | * | 5/2005 | Grossmeyer ................ | 345/169 |

FOREIGN PATENT DOCUMENTS

| JP | 8-1670 | 12/1996 |
|---|---|---|
| JP | 2002-6988 | 1/2002 |
| JP | 2004-145553 | 5/2004 |

* cited by examiner

*Primary Examiner*—Kevin M Nguyen
(74) *Attorney, Agent, or Firm*—Whitham Curtis Christofferson & Cook, PC

(57) ABSTRACT

Provided is an electronic device including: a device main body that processes data; a display device arranged in the device main body to display the data; a first operation device arranged in the device main body on a display surface side of the display device within a movable range of fingers of a hand for holding the device main body; a second operation device arranged in the device main body on an opposite side of the display surface within the movable range of the fingers of the hand for holding the device main body; and a control circuit that causes, only when one of the first operation device and the second operation device is being operated, the other to function.

13 Claims, 11 Drawing Sheets

DATA PROCESSING DEVICE, DATA PROCESSING METHOD, AND ELECTRONIC DEVICE

BACKGROUND OF THE INVENTION

1. Field of the Invention

The present invention relates to a data processing device, a data processing method, and an electronic device. In particular, the invention relates to a data processing device, a data processing method, and an electronic device, such as an electronic book.

2. Description of the Related Art

A recent progress in information technology (IT) has provided a display device such as a high-performance display, and with popularization of Internet, a technology for distributing a large volume of data has been proposed. Among recent electronic devices in widespread use, for example, there is an electronic book proposed to display data of a book, a magazine, a newspaper, or the like that has been provided as a printed matter (refer to JP 2004-145553 A).

Another proposed one of the electronic devices has been a computer input device in which operation keys for performing shift operations and a display device are arranged on a front side of a device main body, and input keys for inputting symbols such as characters or numerals are arranged on a backside of the device main body (refer to paragraph numbers "0022" to "0024" and FIGS. 5 and 6 of Japanese Utility Model Application Laid-open No. H08-001670). Yet another proposed one of the electronic devices has been a portable terminal device in which a display device and operation keys are arranged on a front side of a device main body and an operation pad is arranged on a backside of the device main body (refer to paragraph numbers "0014" and "0017" and FIG. 1 of JP 2002-006988 A).

In the computer input device of the Japanese Utility Model Application Laid-open No. H08-001670, the plurality of input keys are arranged on the backside of the device main body. Thus, for example, there is a fear that input keys will be erroneously operated to input wrong characters. In the portable terminal device of JP 2002-006988 A, if certain processing such as magnification or reduction of a display screen can be carried out only by operating the operation pad arranged on the backside of the device main body, there is a fear that the display screen will be magnified or reduced by an erroneous operation of the operation pad.

Furthermore, in the electronic device such as the electronic book of the JP 2004-145553 A, a device main body must be held by hand for a long time in the case of reading a novel. Thus, when an operation device or the like is arranged on a front or backside of the electronic book, as described above, a fear of erroneously operating input keys or an operation pad arranged on the front side or backside of the electronic book will increase.

SUMMARY OF THE INVENTION

In view of the foregoing and other exemplary problems, drawbacks, and disadvantages of the conventional structures, an exemplary feature of the present invention is to provide a data processing device, a data processing method, and an electronic device, which are capable of preventing an erroneous operation of an operation device.

In order to achieve the above exemplary feature of the present invention, there is provided an electronic device, including: a device main body including processing circuit that processes data; a display device arranged in the device main body to display the data; a first operation device arranged in the device main body on a display surface side of the display device within a movable range of fingers of a hand for holding the device main body; a second operation device arranged in the device main body on an opposite side of the display surface within the movable range of the fingers of the hand for holding the device main body; and a control circuit that causes, only when one of the first operation device and the second operation device is being operated, the other to function.

In order to achieve the above exemplary feature of the present invention, there is provided a data processing device, including: a display device arranged in a device main body to display data; a first operation device arranged in an outer periphery of a display surface of the display device within a movable range of fingers of a hand for holding the device main body; a second operation device arranged in the device main body on an opposite side of the display surface within the movable range of the fingers of the hand for holding the device main body; and a control circuit that causes, only when one of the first operation device and the second operation device is being operated, the other to function.

In order to achieve the above exemplary feature of the present invention, there is provided a data processing device, including: display means for displaying data, which is arranged in a device main body; a first operation means arranged in an outer periphery of a display surface of the display device within a movable range of fingers of a hand for holding the device main body; a second operation arranged in the device main body on an opposite side of the display surface within the movable range of the fingers of the hand for holding the device main body; and control means for causing, only when one of the first operation means and the second operation means is being operated, the other to function.

In order to achieve the above exemplary feature of the present invention, there is provided a data processing method, including: detecting an operation of one of a first operation device arranged on one surface side of a device main body and a second operation device arranged on the other surface side of the device main body; and processing based on an operation of the other of the first operation device and the second operation device only when a detection of the operation is being maintained.

According to the data processing device, the data processing method, and the electronic device of the present invention, for example, only when the operation of the first operation device is detected, the processing based on the second operation device is executed. Thus, it is possible to prevent an erroneous operation of the second operation device.

DETAILED DESCRIPTION OF THE PREFERRED EMBODIMENTS

First Exemplary Embodiment

Hereinafter, referring to FIGS. 1 to 5, a data processing device, a data processing method, and an electronic device, such as an electronic book, according to a first exemplary embodiment of the present invention will be described. The electronic book of the first exemplary embodiment is an electronic device which displays data of a book, a magazine, a newspaper, or the like that has been provided as a printed matter and enables holding of a device main body by hand as in the case of reading a book.

(Schematic Configuration of Electronic Book)

Figure 1:
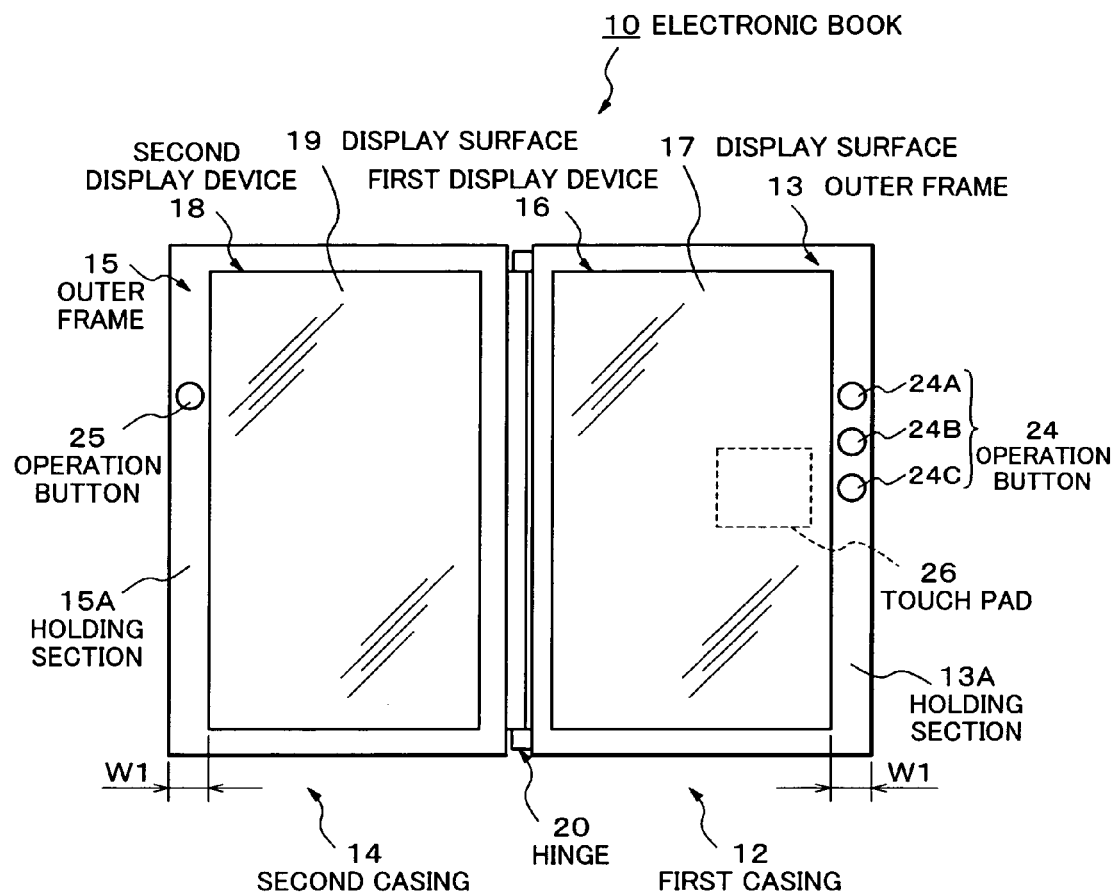
FIG. 1 is a diagram of an opened electronic book viewed from its display surface side according to a first exemplary embodiment of the present invention.

As shown in FIG. 1, in an electronic book 10, first and second sheet metal casings 12 and 14 are connected together via a hinge 20 serving as opening/closing means. The first and second casings 12 and 14 can be opened/closed via the hinge 20 so as to be double spread. In the electronic book 10, the first and second casings 12 and 14 can be folded as in the case of a book (see FIG. 2). The electronic book 10 of this exemplary embodiment is set so that the casings 12 and 14 can be used in a portrait orientation.

A first display device 16 constituted of a liquid crystal panel, a plasma display panel, or the like is disposed in the first casing 12. In the second casing 14, a second display device 18 constituted of a liquid crystal panel, a plasma display panel, or the like is disposed on a surface side corresponding to the first display device 16.

In other words, the first and second display devices 16 and 18 are arranged so that display surfaces (display screens) 17 and 19 thereof, respectively, can face each other when the first and second casings 12 and 14 are closed. The first and second casings 12 and 14 incorporate various electronic components such as storing devices, a battery, etc. The first and second display devices 16 and 18 are mounted to outer frames 13 and 15 of the first and second casings 12 and 14, respectively.

A plurality of, e.g., three operation buttons 24 (24A, 24B, and 24C) are arranged in a holding section (a portion on one surface side of the first casing 12 and on an opposite side of the hinge 20) 13A of the outer frame 13. The operation buttons 24 that are press-button type operation keys include buttons such as a page-turning button and a button for turning power ON. The number of operation buttons 24 may be one, two, or four or more. The operation button 24 is a key device, constituting a part of a first operation device 36 (see FIG. 3).

For example, one operation button 25 is arranged in a holding section (a portion on one surface side of the second casing 14 and on an opposite side of the hinge 20) 15A of the outer frame 15. The operation button 25 includes a button such as a page-turning button. The number of operation buttons 25 may be two or more. The operation button 25 constitutes a part of the first operation device 36 (see FIG. 3).

Figure 2:
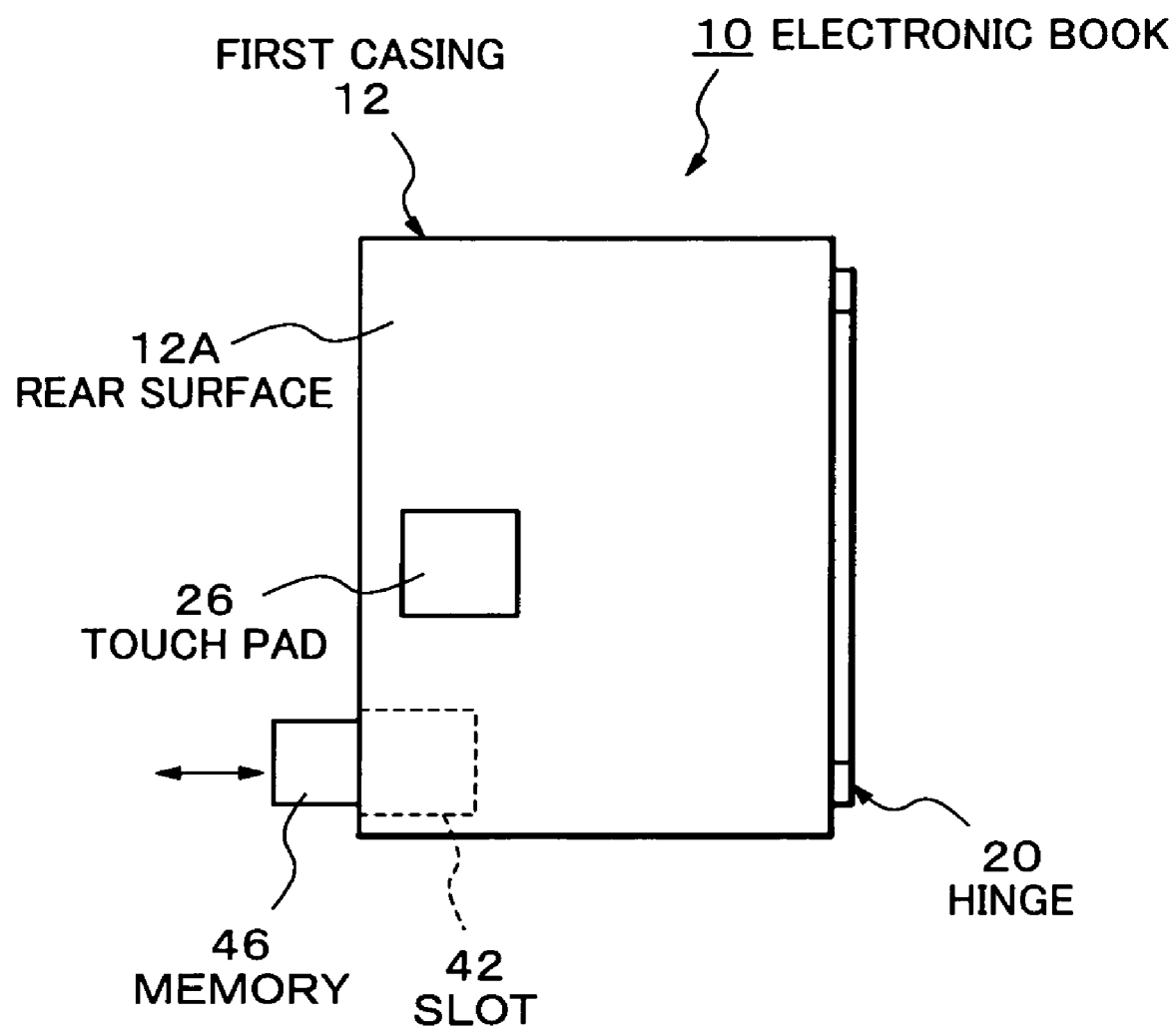
FIG. 2 is a diagram of the closed electronic book of FIG. 1 viewed from its backside.

As shown in FIG. 2, a touch pad 26 constituting a pointing device is arranged in a rear surface (other surface) 12A of the first casing 12. The touch pad 26 constitutes a part of a second operation device 38 (see FIG. 3).

Figure 5:
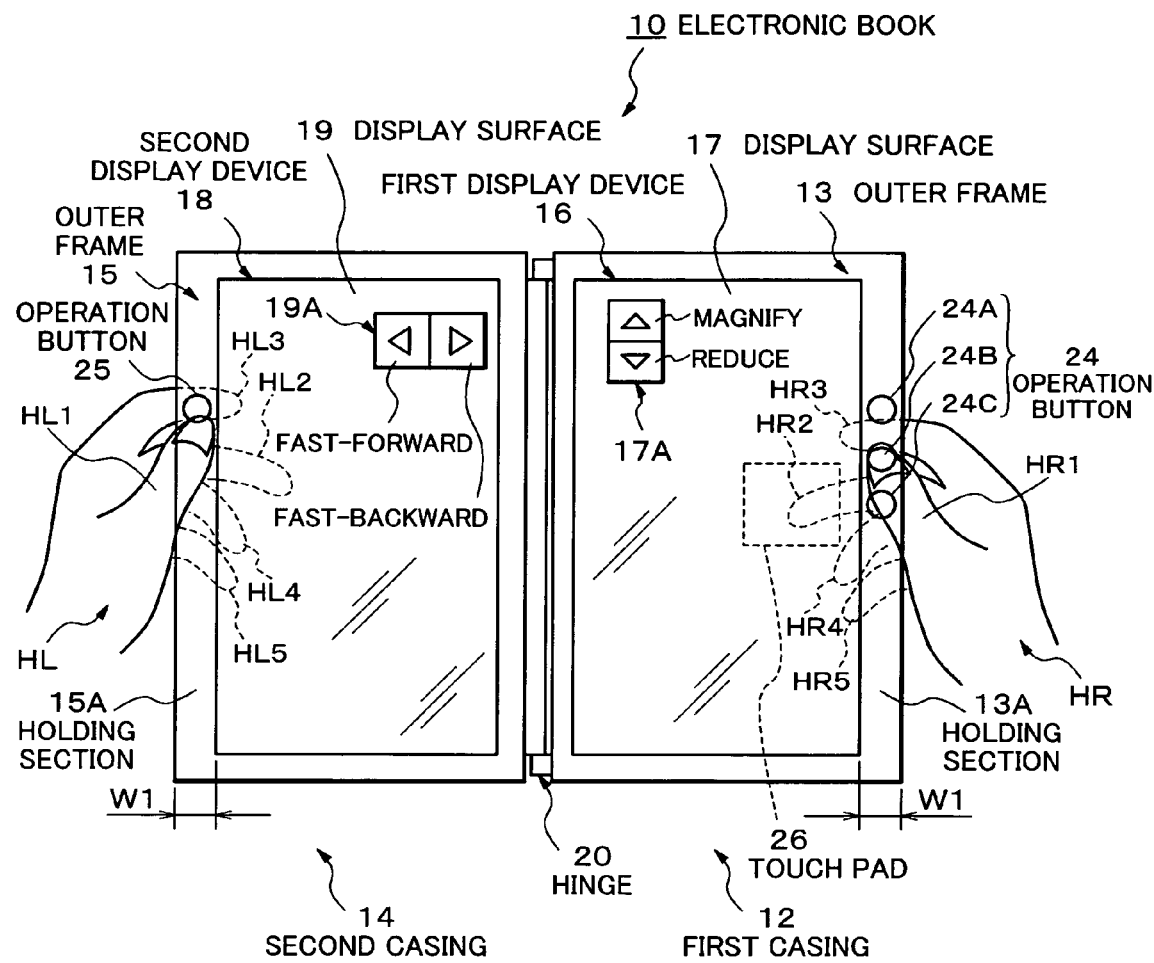
FIG. 5 is a diagram of the electronic book of FIG. 1 held by hand.

As shown in FIG. 5, in a state of holding the first casing 12 of the electronic book 10 with a right hand HR, for example, the operation button 24 and the touch pad 26 are arranged in positions corresponding to fingers HR1 to HR5 of the right hand HR within a movable range of the finger HR1, HR2, or the like. Specifically, for example, a thumb HR1 of the right hand HR is arranged within a movable range that allows the operation of the operation buttons 24A to 24C. Further, for example, a forefinger HR3, a middle finger HR2, a third finger HR4, or the like of the right hand HR is arranged within a movable range that allows the operation of the touch pad 26. According to this exemplary embodiment, the operation button and the touch pad only need to be arranged as a pair at least in one place (right or left side) of an area for holding the electronic book 10 by hand.

In contrast, the operation button 25 is arranged in one of positions corresponding to fingers HL1 to HL5 of the left hand HL within a movable range of the finger HR1, HR2, or the like. Specifically, for example, a thumb HL1 of the left hand HL is arranged within a movable range that allows the operation of the operation button 25.

Figure 6:
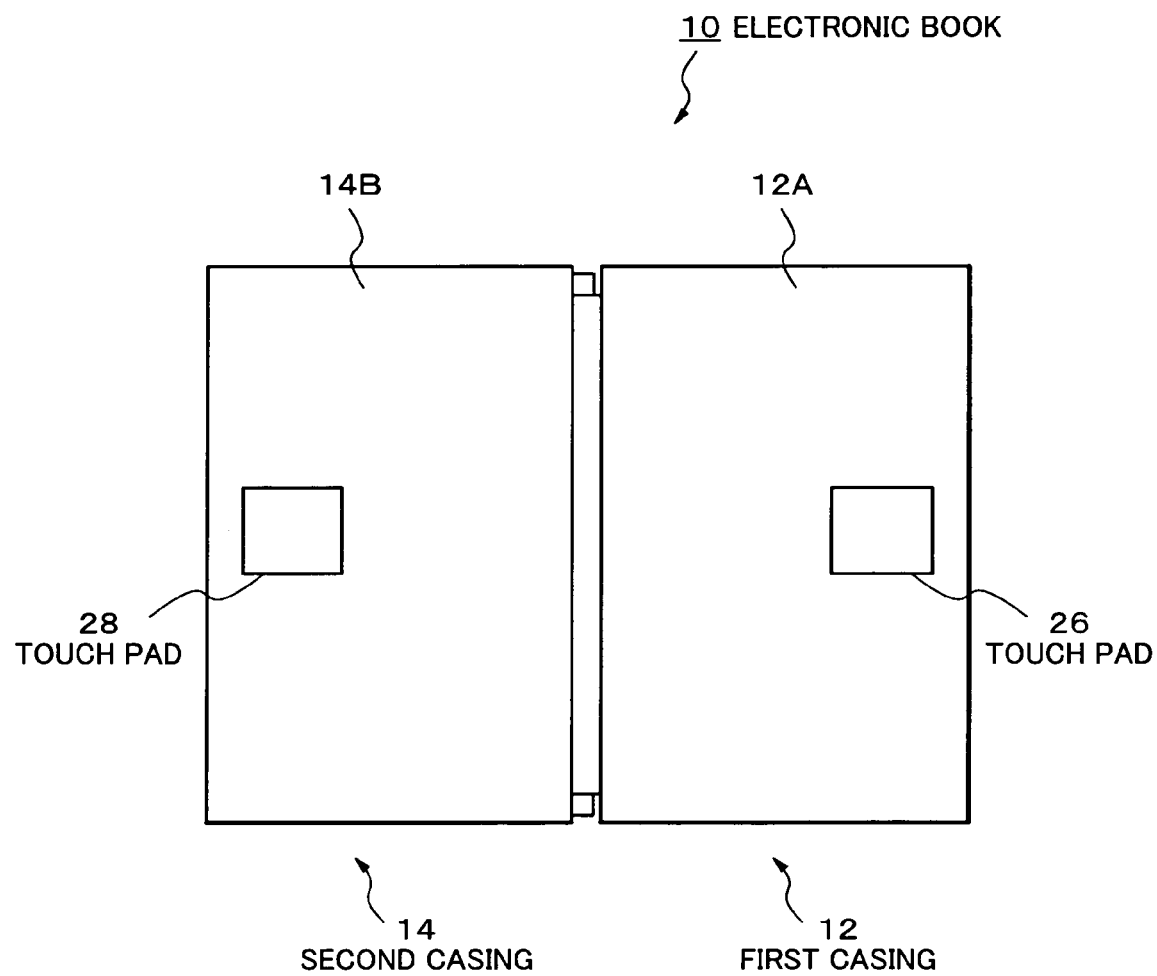
FIG. 6 is a diagram of an opened electronic book viewed from its backside according to a modified example of the first exemplary embodiment.

According to a modified example of this exemplary embodiment, as shown in FIG. 6, for example, a touch pad 26 may be arranged on a rear surface 14A of the second casing 14 within a movable range that allows the operation with a middle finger HL2 of the left hand HL. In the electronic book 10 of this exemplary embodiment, a magnet may be disposed in the holding section 13A or 15A to prevent improper opening of the first and second casings 12 and 14.

The number or the arranging positions of operation buttons or pointing devices can be optionally changed. For example, the pointing device may be arranged only on the rear surface 14A of the second casing 14, or the operation button may be arranged in at least one place of the outer frame 13 or 15. Further, the operation button or the pointing device may be disposed on a short side section of the outer frame 13 or 15 (side orthogonal to the holding section 13A or 15A).

A width W1 (see FIG. 1) of the holding section 13A or 15A is decided in consideration of portability of the electronic book 10, a display size of the display device 16 or 18, or the like. It is becoming popular that the width is set to be as small as possible. Accordingly, the operation button 24 or 25 arranged even in a narrow space is selected as an operation member of the operation device arranged in the outer frame 13 or 15.

On the other hand, regarding an operation member of the operation device arranged on the rear surface 12A or 14A of the casing 12 or 14, respectively, a space therefor does not need to be considered, but the operation member must be operable only by a sensation (feeling) of a finger without being visually recognized. Accordingly, a pointing device such as a touch pad, a trackball, or a track point is selected as the operation member of the operation device arranged on the rear surface 12A or 14A.

Referring to FIG. 5, an operation of holding the first and second casings 12 and 14 of the opened electronic book 10 with both hands will be described. For example, the thumb HR1 of the right hand HR is set in a corresponding relation to the operation buttons 24A to 24C arranged in the holding section 13A of the outer frame 13, and positioned within an operable range of the operation button 24. Additionally, for example, the middle finger HR2 or the like of the right hand HR is set in a corresponding relation to the touch pad 26 arranged on the rear surface 12A of the first casing 12, and positioned within an operable range of the touch pad 26.

On the other hand, for example, the thumb HL1 of the left hand HL is set in a corresponding relation to the operation button 25 arranged in the holding section 15A of the outer frame 15, and positioned within an operable range of the operation button 25. The fingers HL2 to HL5 other than the thumb HL1 of the left hand HL are positioned on the rear surface 14A of the second casing 14 to hold the second casing 14. According to this exemplary embodiment, in the state of holding the electronic book 10 by hand, for example, the thumb HR1, the middle finger HR2, or the like corresponding to the operation button 24 or the touch pad 26 is moved, whereby the operation button 24 or the touch pad 26 can be operated.

Here, for example, the operation button 24A or 25 is for turning each page forward or backward to another page. The operation button 24A is for turning each page forward to the next page. The operation button 25 is for turning each page backward to the previous page. When the operation button 24A is operated (pressed), for example, pages of book data to be read a returned forward. When the operation button 25 is operated (pressed), for example, pages of book data to be read are turned backward.

For example, in the state of pressing (operating) the operation button 24B, a display screen displayed on the display surface 17 or 19 is magnified or reduced by sliding a finger on the touch pad 26. For example, when the operation button 24B is operated, a magnification/reduction mode is set, thereby displaying an instruction screen 17A of the magnification/reduction mode on the display surface 17 (see FIG. 5). Then, with the operation button 24B being held down, the display screen is magnified or reduced by performing an operation following the instruction screen 17A of FIG. 5. For example, in the case of magnifying the display screen, the finger is slid up (in an upper direction) on the touch pad 26 with the operation button 24B being held down. On the other hand, in the case of reducing the display screen, the finger is slid down (in a lower direction) on the touch pad 26 the operation button 24B being held down.

Further, the finger is slid on the touch pad 26 with the operation button 24C being held down (operated), whereby pages displayed on the display surface 17 or 19 are turned forward or backward to a desired page. For example, when the operation button 24C is operated, a fast-forward/fast-backward mode is set, thereby displaying an instruction screen 19A of the fast-forward/fast-backward mode on the display screen 19 (see FIG. 5). Then, with the operation button 24C being held down, the pages are turned forward or backward to a desired page by performing an operation following the instruction screen 19A of FIG. 5. For example, in the case of a fast-forward operation to a desired page, the finger is slid right to left (in a left direction) on the touch pad 26 with the operation button 24C being held down (operated). On the other hand, in the case of a fast-backward operation to a desired page, the finger is slid left to right (in a right direction) on the touch pad 26 with the operation button 24C being held down.

By operating the touch pad 26, for example, data of a text or software is selected to execute processing such as connection to the Internet or dictionary search, or adjustment of contrast of the display screen. By moving a cursor on the touch pad, for example, characters or symbols on a software keyboard are designated to input data.

Thus, according to this exemplary embodiment, the operation button 24 and the touch pad 26 are arranged on the front and rear surfaces of the first casing 12, for example, within the movable range of the fingers of the right hand in the state of holding the electronic book 10. Accordingly, a desired operation such as connection to the Internet or adjustment of the display screen can be carried out reliably and surely, thereby improving operability.

Figure 3:
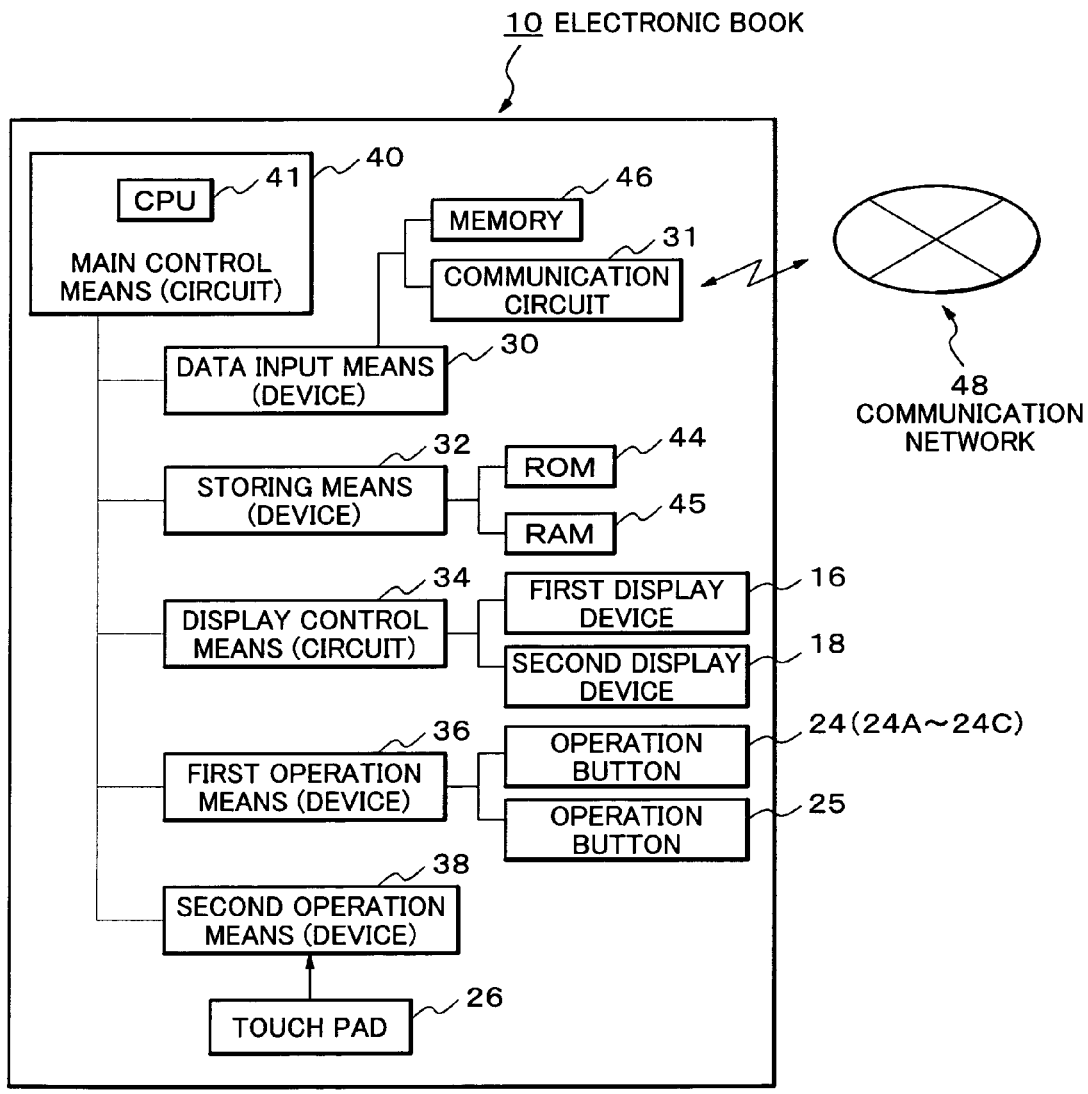
FIG. 3 is a block diagram of the electronic book shown in FIG. 1.

As shown in FIG. 3, the electronic book 10 includes data input means (a data input device) 30, storing means (a storing device) 32, display control means (a display control circuit) 34, a first operation means (first operation device) 36, a second operation means (second operation device) 38, and main control means (a main control circuit) 40. The data input device 30, the storing device 32, the display control circuit 34, and the first and second operation devices 36 and 38 are connected to the main control circuit 40.

The data input means 30 includes a communication circuit 31 or a data reading circuit (not shown). The data input means 30 inputs data via, e.g., a communication network 48, or from a recording medium (memory 45) such as a CD-ROM installed in the electronic book 10. Here, the method of inputting the data via the communication network 48 adopts wired, radio, or infrared-ray transmission. In the electronic book 10, a slot 42 (see a broken line of FIG. 2) is disposed to insert a memory 45 shown in FIG. 2.

The storing device 32 includes a recording medium such as a read only memory (ROM) 44 or a random access memory (RAM) 45. The recording medium such as the ROM 44 has a memory area (program area, work area, or the like) dedicated to reading of a program for executing various processing operations, or various data. The recording medium such as the RAM 45 has a memory area for reading/writing various data or a memory area for storing input data. Data read from the storing device 32 is displayed on the first or second display device 16 or 18 via the display control circuit 34. The display devices 16 and 18 display data on a page basis.

The main control circuit 40 is control means constituted of a central processing unit (CPU) 41 or the like. The main a control circuit 40 is in control of an overall operation of the electronic book 10. For example, when the operation buttons 24 and 25 of the first operation device 36 are operated, or when the touch pad 26 of the second operation device 38 is operated, the main control circuit 40 executes processing based on the operation.

(Operation of this Exemplary Embodiment)

Figure 4:
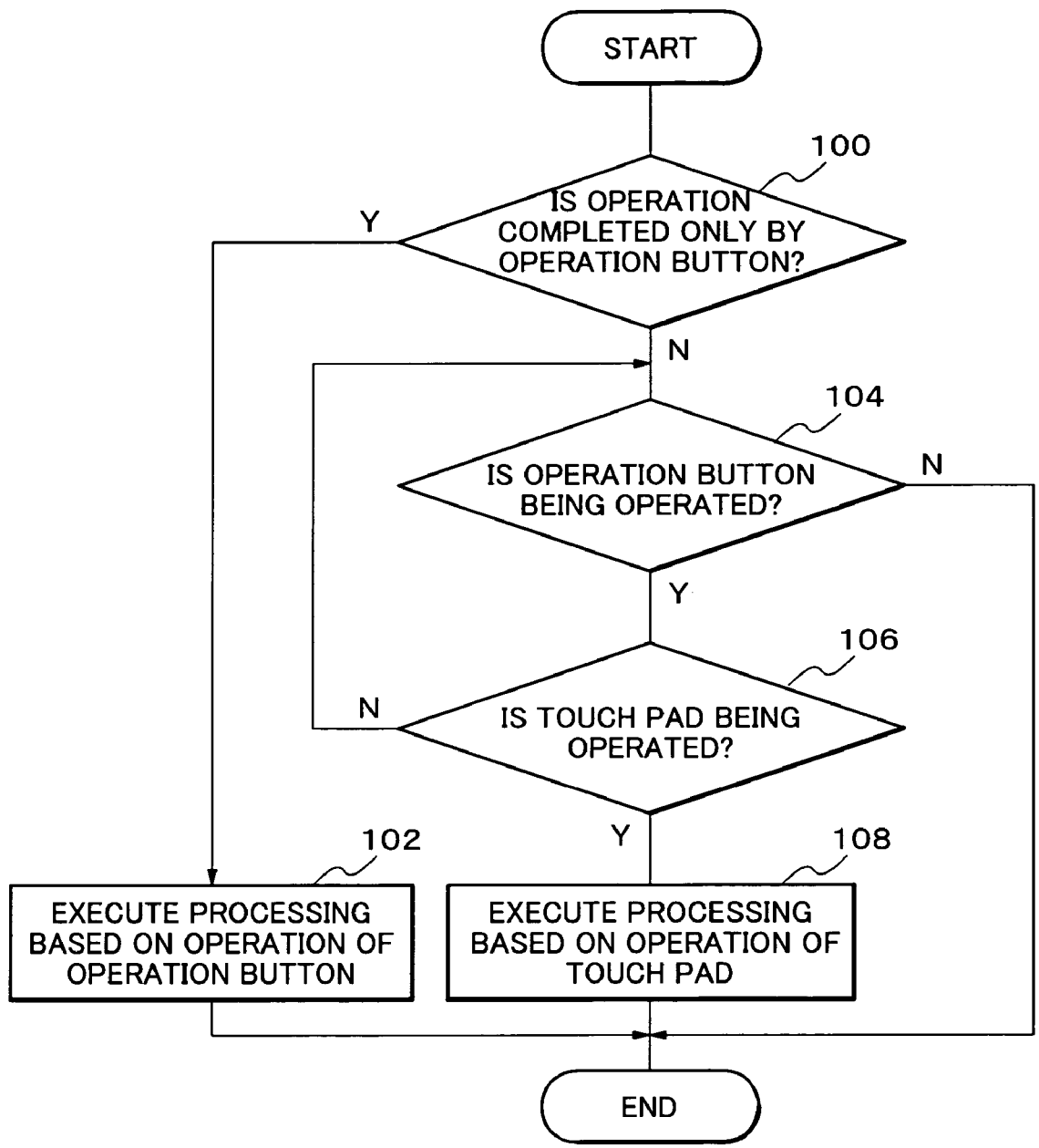
FIG. 4 is a flowchart of an operation mode according to the first exemplary embodiment.

Referring to FIG. 4, processing regarding an operation mode of the electronic book 10 (see FIG. 3) will be described. In the operation mode, displayed contents of the first or second display device 16 or 18 are changed based on an operation signal of the operation button 24 or the touch pad 26 shown in FIG. 3. FIG. 4 is a flowchart showing a processing routine executed by the main control circuit 40 of the electronic book 10 shown in FIG. 3. A program is prestored in a program area of the ROM 44 of the storing device 32.

The flowchart of FIG. 4 shows a process executed by operating the operation button 24 after a power key 24C (see FIG. 3) of the electronic book 10 is turned ON (after an image is displayed on the display surface 17 or 19 of FIG. 1). The processing of the operation mode continues until the operation of the operation button 24 or the touch pad 26 ends. According to this exemplary embodiment, the processing of the operation mode may be executed by operating only one of the operation button 24 and the touch pad 26.

In step 100, the main control circuit 40 shown in FIG. 3 determines whether an operation is completed or not only by, e.g., the operation buttons 24A to 24C or 25 (first operation device 36). For example, the operation completed only by the first operation device 36 is an operation involved in turning-off of the operation button 24C. In the case of YES in the step 100, i.e., in the case of an operation completed only by the first operation device 36, in step 102, the main control circuit 40 executes processing based on the operations of the operation buttons 24A to 24C or 25, e.g., processing involved in the turning-off of the operation button 24C.

In the case of NO in the step 100, i.e., in the case of an operation not completed only by the first operation device 36, in step 104, the main control circuit 40 determines whether the operation buttons 24A to 24C or 25 have been operated or not (i.e., whether or not the operation button 24 or 25 has been held down). In the case of YES in the step 104, i.e., if the holding-down of the operation button 24 or 25 is being detected, in step 106, the main control circuit 40 determines whether the touch pad 26 is being operated or not.

In the case of YES in the step 106, i.e., if the touch pad 26 is being operated, in step 108, the main control circuit 40 executes processing based on the operation of the touch pad 26. For example, the main control circuit 40 executes processing of magnifying or reducing a display screen of the first or second display surface 17 or 19. In other words, in a state of a magnification/reduction mode (state where the operation button 24B is held down), when the finger is slid up or down on the touch pad 26, the main control circuit 40 executes the processing of magnifying/reducing the display screen.

In a state of fast-forward/fast-backward mode (state where the operation button 24C is held down), when the finger is slid right or left on the touch pad 26, the main control circuit 40 executes processing of turning pages displayed on the display surface 17 or 19 forward or backward to a desired page, thereby changing the current page on the display screen to the desired page.

In the case of NO in the step 104, i.e., if the operation button has not been continuously pressed, the main control circuit 40 finishes the process of the flowchart. For example, if the touch pad 26 alone is operated in the state in which the operation button 24 or 25 has not been continuously pressed, the main control circuit 40 finishes the process of the flowchart without executing the processing of magnification/reduction or page-turning. On the other hand, in the case of NO in the step 106, i.e., if the touch pad 26 has not been operated, returning to the step 104, the main control circuit 40 continues the processing of the step 104 and after.

As shown in FIG. 5, the touch pad 26 (second operation device) is arranged in the position corresponding to the finger HR2 or the like when the electronic book 10 is held with the hand HR. Accordingly, the touch pad 26 may be touched and operated irrespective of user's intention. According to this exemplary embodiment, for example, only when the main control circuit 40 (see FIG. 3) detects the operation of the operation button 24 or 25, the processing based on the operation of the touch pad 26 is executed. Thus, it is possible to prevent an erroneous operation of the touch pad 26.

Second Exemplary Embodiment

Figure 7:
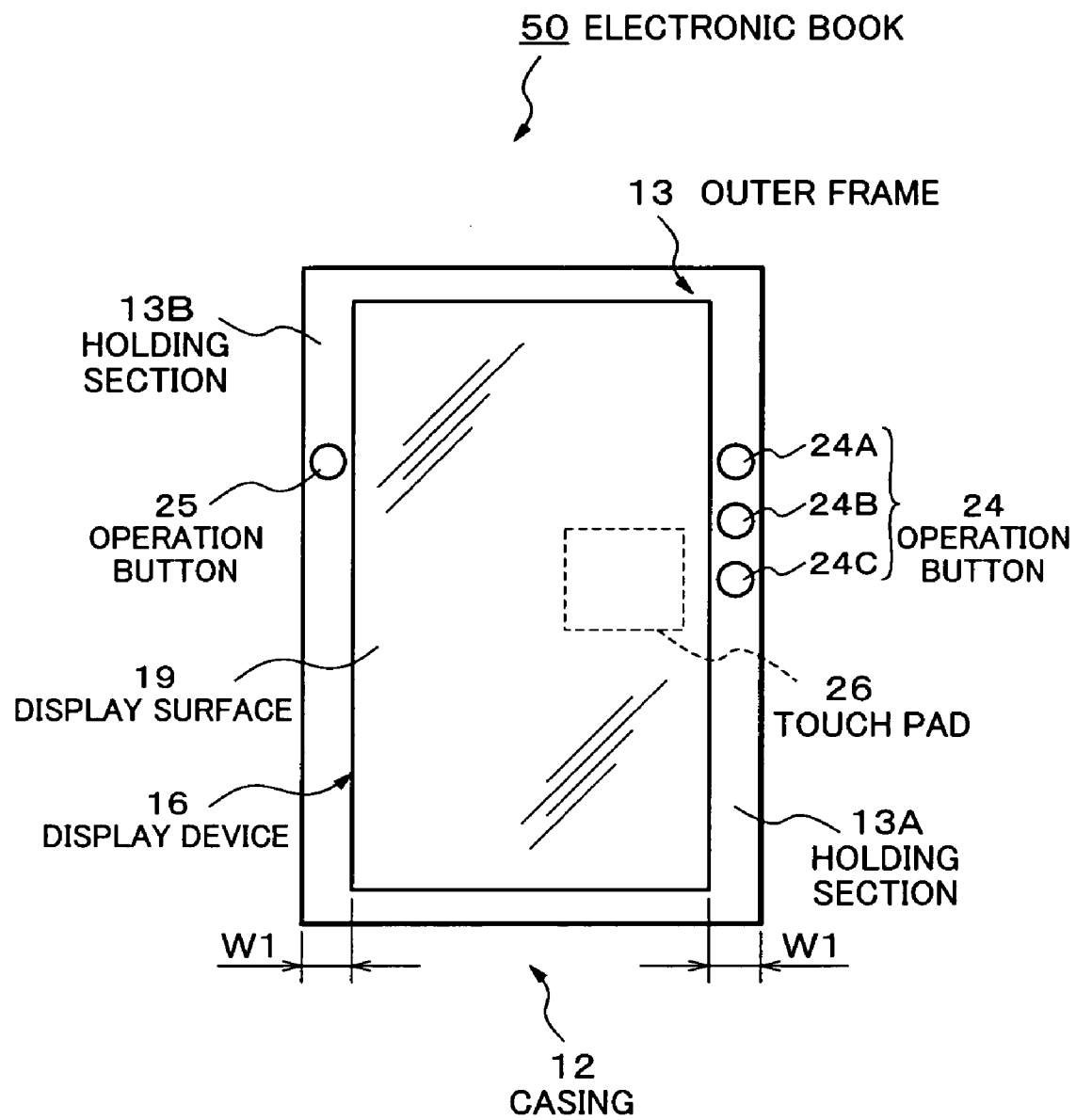
FIG. 7 is a diagram of an electronic book viewed from its display surface side according to a second exemplary embodiment of the present invention.
Figure 8:
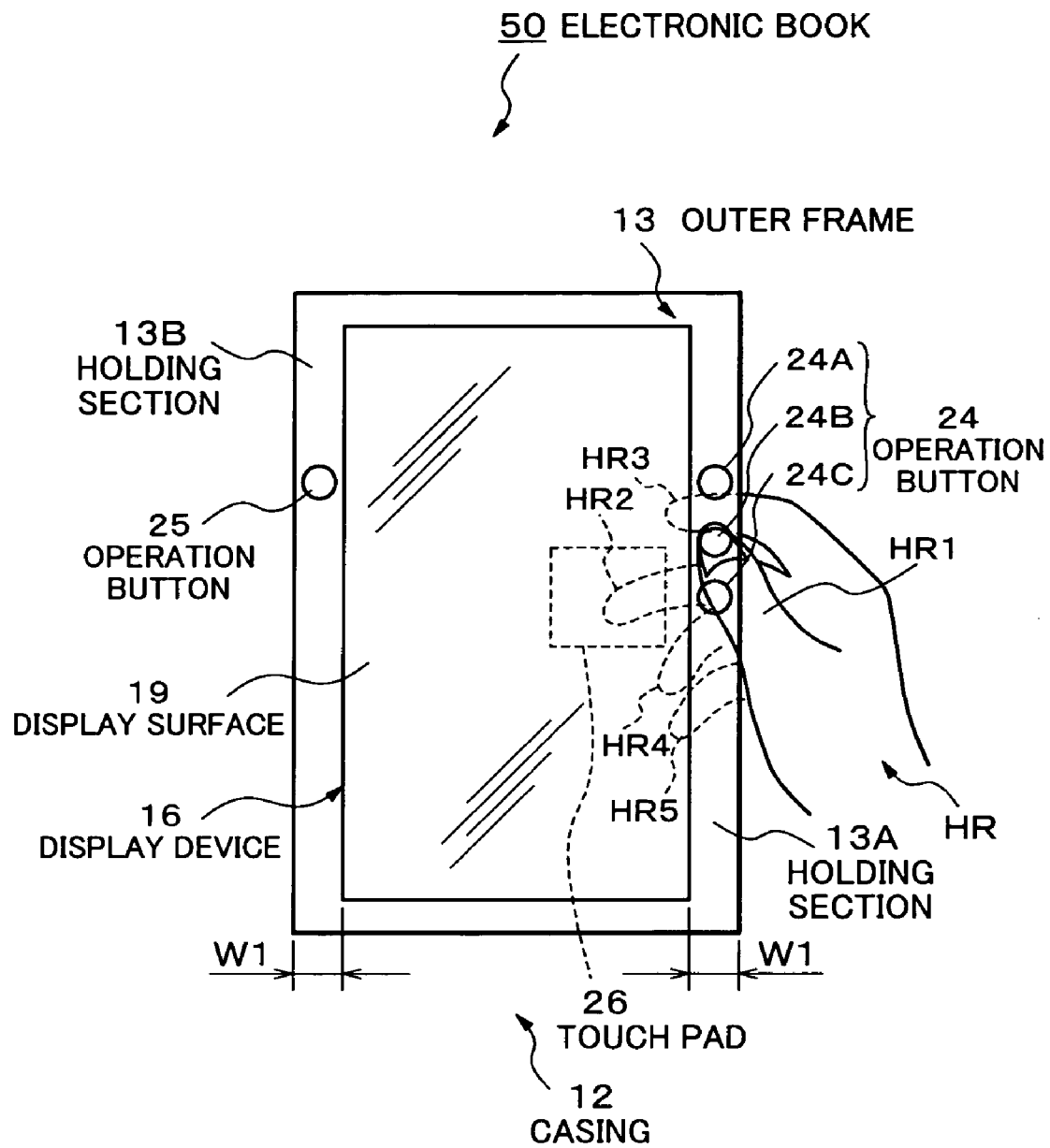
FIG. 8 is a diagram of the electronic book of FIG. 7 held by hand.
Figure 9:
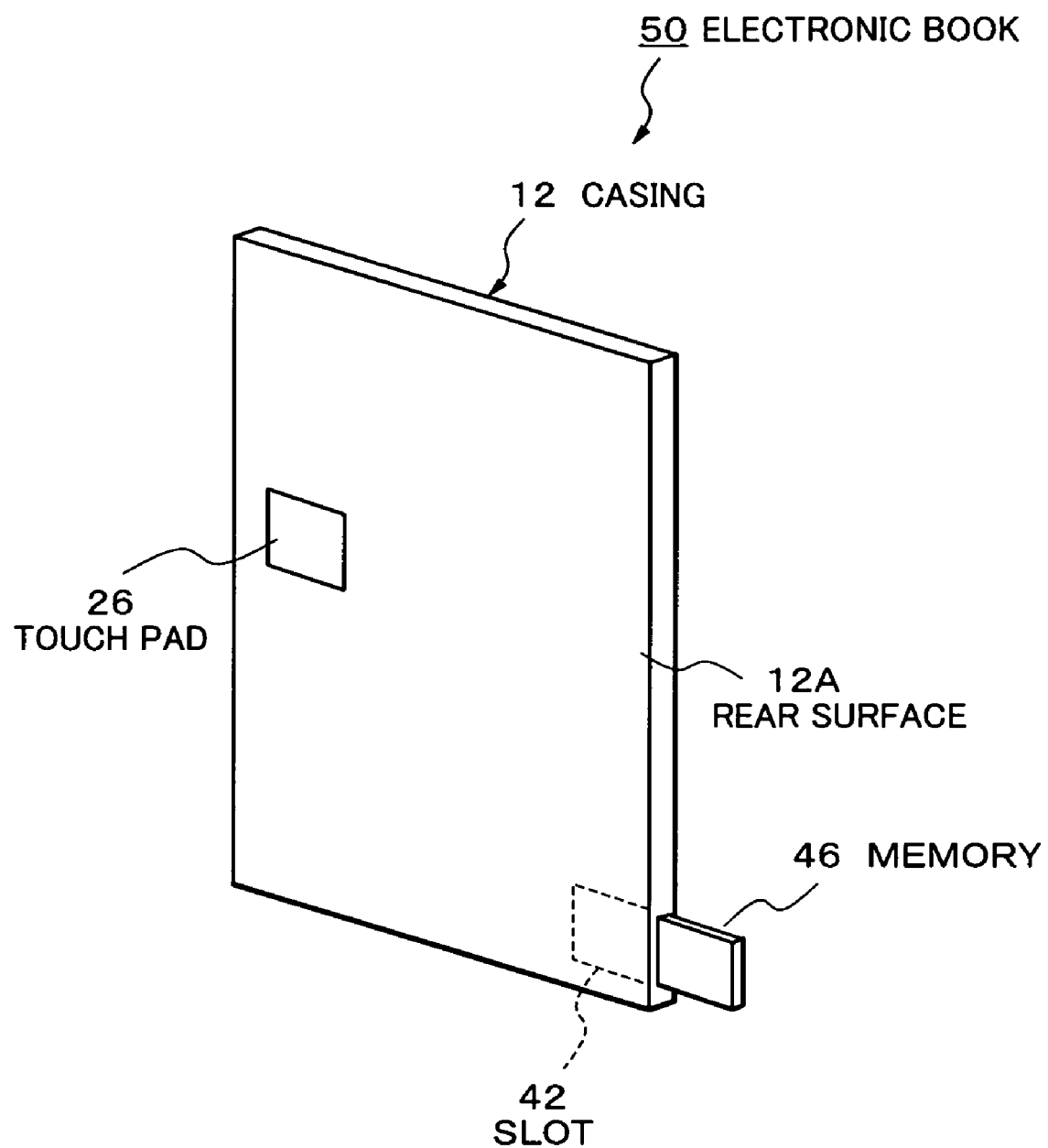
FIG. 9 is a perspective view of the electronic book of FIG. 7 viewed from its backside.

FIGS. 7 to 9 show a second exemplary embodiment of the present invention. Unlike the electronic book 10 of the first exemplary embodiment, an electronic book 50 of this exemplary embodiment includes only a single casing. The casing shown in FIG. 7 is roughly similar in structure to the first casing 12 shown in FIG. 1. FIG. 7 is a front view of the electronic book 50 of this exemplary embodiment. FIG. 8 is a front diagram showing how the electronic book 50 of this exemplary embodiment is held with one hand. FIG. 9 is a perspective diagram of the electronic book 50 of this exemplary embodiment, which shows its backside. In a configuration of the electronic book 50 of this exemplary embodiment of FIG. 7, the same components as those of FIG. 1 are denoted by identical reference numerals, and briefly described.

Referring to FIG. 7, the configuration of the electronic book 50 will be briefly described. A display device 16 is disposed in the casing 12 of the electronic device 50. The display device 16 is mounted to an outer frame 13 of the casing 12. In the casing 12, as shown in FIG. 9, a slot 42 (see broken line of FIG. 9) is defined, in which a recording medium (memory) 46 is inserted. Then, for example, data read from the recording medium (memory) 46 or the like is displayed on a display surface (display screen) 17 of the display device 16.

For example, three operation buttons 24 (24A, 24B, and 24C) are arranged in a holding section 13A of the outer frame 13. In the outer frame 13, a holding section 13B is disposed in a position opposed to the holding section 13A. For example, one operation button 25 is arranged in the holding section 13B. Further, as shown in FIG. 9, a touch pad 26 is arranged on a rear surface 12A of the casing 12. According to this exemplary embodiment, the operation button 25 is a power button, and the operation button 24C is a page-turning button. Other components are similar to those of the first exemplary embodiment, and thus description thereof will be omitted.

According to this exemplary embodiment, as shown in FIG. 7, the electronic book 50 includes only the single casing 12. Thus, the electronic book 50 can be held only with one hand (e.g., right hand HR) (see FIG. 8). Even in the case of holding, the electronic book 50 only with the right hand HR, the operation buttons 24A to 24C and the touch pad 26 are arranged in positions corresponding to a finger HR1, HR2, or the like of the right hand HR, and thus the operation buttons 24A to 24C and the touch pad 26 can be operated only by the finger HR1, HR2 or the like of the right hand HR.

Other operational effects are similar to those of the first exemplary embodiment, and thus detailed description thereof will be omitted. According to this exemplary embodiment, the operation button 24 and the touch pad 26 may be disposed only on the holding section 13A side without disposing the operation button 25 in the holding section 13B. According to this exemplary embodiment, the operation button 24 and the touch pad 26 may be disposed only on the holding section 13B side.

Figure 10:
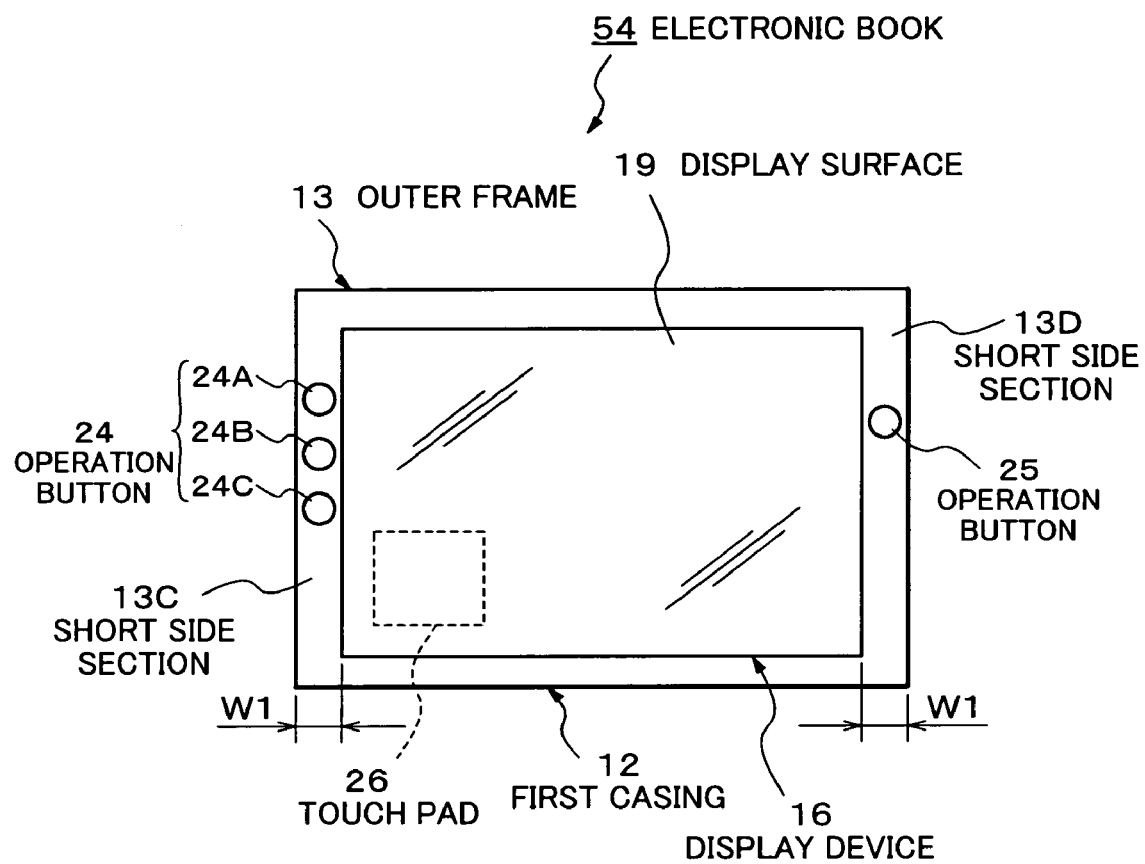
FIG. 10 is a diagram of an electronic book viewed from its display surface side according to a modified example of the second exemplary embodiment.

Referring to FIG. 10, a modified example of this exemplary embodiment will be described. According to this modified example, in an electronic book 54 used in a landscape orientation, operation buttons 24A to 24C and a pointing device 26 may be disposed on at least one (left), short side section 13C of an outer frame 13, and an operation button 25 may be disposed on the other (right) short side 13D thereof. Other components and operational effects are similar to those of the second exemplary embodiment, and thus description thereof will be omitted.

Figure 11:
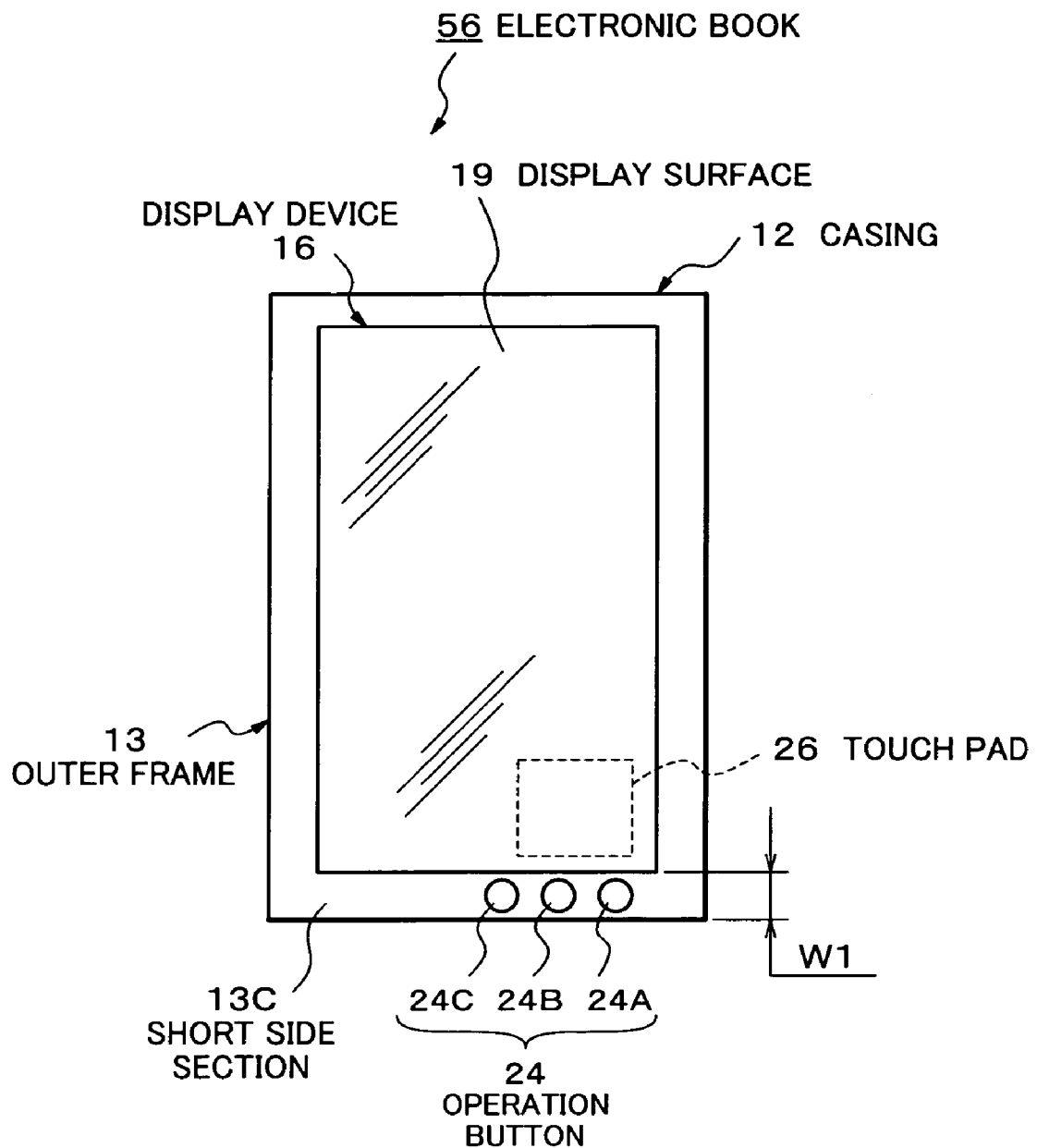
FIG. 11 is a diagram of an electronic book viewed from its display surface side according to another modified example of the second exemplary embodiment.

Referring to FIG. 11, another modified example of this exemplary embodiment will be described. According to this modified example, in an electronic book 56 used in a portrait orientation, operation buttons 24A to 24C and a pointing device 25 may be disposed on one (lower) short side section 13C of an outer frame 13. Other components and operational effects are similar to those of the second exemplary embodiment, and thus description thereof will be omitted. Further, regarding combination patterns of the present invention, for example, two or more of this exemplary embodiments and this modified examples may be combined.

As shown in FIG. 1, the electronic device of this exemplary embodiment includes the casing 12 or 14 which is a device main body, the display device 16 or 18 arranged in the casing 12 or 14, the first operation device (operation button) 24 or 25 arranged in the casing 12 or 14 on the display surface 17 or 19 side of the display device 16 or 18 within the movable range of the fingers of the hand for holding the casing 12 or 14, the second operation device (touch pad) 26 arranged on the surface of the casing 12 or 14 opposed to the display surface 17 or 19 within the movable range of the fingers of the hand for holding the casing 12 or 14, and the main control circuit 40 shown in FIG. 3 which causes, only when one of the first operation device (operation button) 24 or 25 and the second operation device (touch pad) 26 is operated, the other of the second operation device (touch pad) 26 and the first operation device (operation button) 24 or 25 to function.

As shown in FIG. 7, the data processing device of this exemplary embodiment includes the display device 16 arranged in the casing 12 which is a device main body, the first operation device (operation button) 24 or 25 arranged in the casing 12 on the display surface 17 side of the display device 16 within the movable range of the fingers of the hand for holding the casing 12, the second operation device (touch pad) 26 arranged on the surface of the casing 12 opposed to the display surface 17 within the movable range of the fingers of the hand for holding the casing 12, and the main control circuit 40 shown in FIG. 3 which causes, only when one of the first operation device (operation button) 24 or 25 and the second operation device (touch pad) 26 is operated, the other of the second operation device (touch pad) 26 and the first operation device (operation button) 24 or 25 to function.

As shown in FIG. 4, the data processing method of this exemplary embodiment includes, detecting an operation of one of a first operation device arranged on one surface side of a device main body and a second operation device arranged on the other surface side of the device main body (see step 106), and processing based on an operation of the other of the first operation device and the second operation device only when a detection of the operation is being maintained (see step 108).

The foregoing process flow (FIG. 4) of the program of the above exemplary embodiments is only described by way of example, and can be properly changed without departing from the gist of the present invention. The electronic device of the present invention conceptually encompasses electronic devices in addition to the electronic book of each exemplary embodiment, e.g., a portable device such as personal digital assistants (PDAs) and an input/output device such as a portable personal computer (PC). Moreover, the electronic device of the present invention may be a portable telephone which includes a radio transmission/reception circuit for transmitting/receiving voice data, mail data, image data, or the like, and a data processing circuit.

Further, it is noted that the inventor's intent is to retain all equivalents of the claimed invention even if the claims are amended during prosecution.

What is claimed is:

1. An electronic device, comprising:
 a main body including processing circuit that processes data, wherein the main body comprises first and second casings where the first casing comprises a first display device on a surface side and where the second casing comprises a second display device disposed on a surface side wherein the surface sides of said first and second casing correspond to each other;
 at least one first operation device arranged in the main body on either or both said first and second casings on said surface side of said first or second casing within a movable range of fingers of a hand for holding the main body, wherein the first operation device comprises press-button type operation keys;
 at least one second operation device arranged in the main body on either or both said first and second casings on an opposite side of said first or second casing relative to said surface side within the movable range of the fingers of the hand for holding the main body, wherein the second operation device comprises a touch pad; and
 a control circuit that causes, only when one of the first operation device and the second operation device is being operated, the other to function.

2. The electronic device according to claim 1, wherein at least one of the first and second display devices displays the data on a page basis.

3. The electronic device according to claim 1, further comprising:
 a hinge that connects the first casing and the second casing to each other, and is used for one of opening the first casing and the second casing in a double-spread form and closing the first casing and the second casing.

4. The electronic device according to claim 1,
 wherein the first operation device is disposed in at least one of the first casing and the second casing; and
 the second operation device is disposed in only one of the first casing and the second casing.

5. The electronic device according to claim 1, wherein the first operation device is disposed in each of an outer frame of the first display device arranged in the first casing and an outer frame of the second display device arranged in the second casing; and
 the second operation device is disposed in at least one of the first casing and the second casing.

6. The electronic device according to claim 1, wherein the control circuit causes the second operation device to function only when the first operation device is being operated.

7. A data processing device, comprising:
 a main body which comprises first and second casings where the first casing comprises a first display device on a surface side and where the second casing comprises a second display device disposed on a surface side wherein the surface sides of said first and second casing correspond to each other;
 at least one a first operation device arranged in an outer periphery of at least one of the first casing and the second casing within a movable range of fingers of a hand for holding the main body, wherein the first operation device comprises press-button type operation keys;
 at least one second operation device arranged in the main body on either or both said first and second casings on an opposite side of said first or second casing relative to said surface side within the movable range of the fingers of the hand for holding the main body, wherein the second operation device comprises a touch pad; and
 a control circuit that causes, only when one of the first operation device and the second operation device is being operated, the other to function.

8. The data processing device according to claim 7, wherein at least one of the first and second display devices displays data on a page basis.

9. The data processing device according to claim 7, further comprising: opening/closing means for connecting the first casing and the second casing to each other, which is used for one of opening the first casing and the second casing in a double-spread form and closing the first casing and the second casing.

10. The data processing device according to claim 7, wherein the first operation device is disposed in at least one of the first casing and the second casing; and the second operation device is disposed in only one of the first casing and the second casing.

11. The data processing device according to claim 7, wherein the first operation device is disposed in each of an outer frame of the first display device arranged in the first casing and an outer frame of the second display device arranged in the second casing; and the second operation device is disposed in at least one of the first casing and the second casing.

12. The electronic device of claim 1 further comprising means for inputting data from a communication network.

13. The data processing device of claim 7 further comprising means for inputting data from a communication network.

* * * * *